Dec. 28, 1943.  A. C. WESTON  2,338,066

TIRE AND TIRE RIM

Filed July 29, 1941

Inventor

Alfred C. Weston

By Watson E. Coleman
Attorney

Patented Dec. 28, 1943

2,338,066

UNITED STATES PATENT OFFICE 2,338,066

TIRE AND TIRE RIM

Alfred C. Weston, Santa Barbara, Calif.

Application July 29, 1941, Serial No. 404,563

1 Claim. (Cl. 152—381)

This invention relates generally to improvements in wheel rims and pneumatic tires therefor.

The present invention is directed particularly to a wheel rim construction designed to carry or support a pneumatic tire and more especially to improvements in bicycle wheel rims and tires therefor, and the principal object of the invention is to provide an improved form of wheel rim which is so designed in an integral or one piece construction, that there may be readily applied thereto an air tube enclosing casing having wire reinforced edges, which will be maintained in close encircling engagement with the rim body in such a manner that the sides of the casing or edges cannot be raised from the rim to permit a blowing out of the side when air under high pressure is introduced into the tube.

Another object of the invention is to provide a pneumatic tire supporting rim formed in one piece, which has spaced parallel grooves or channels formed thereabout into which the edges of the tire casing are located, with a central and deeper channel between the parallel grooves or channels, which is employed to facilitate the locating of the edges of the casing in their respective grooves.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

Figure 1:
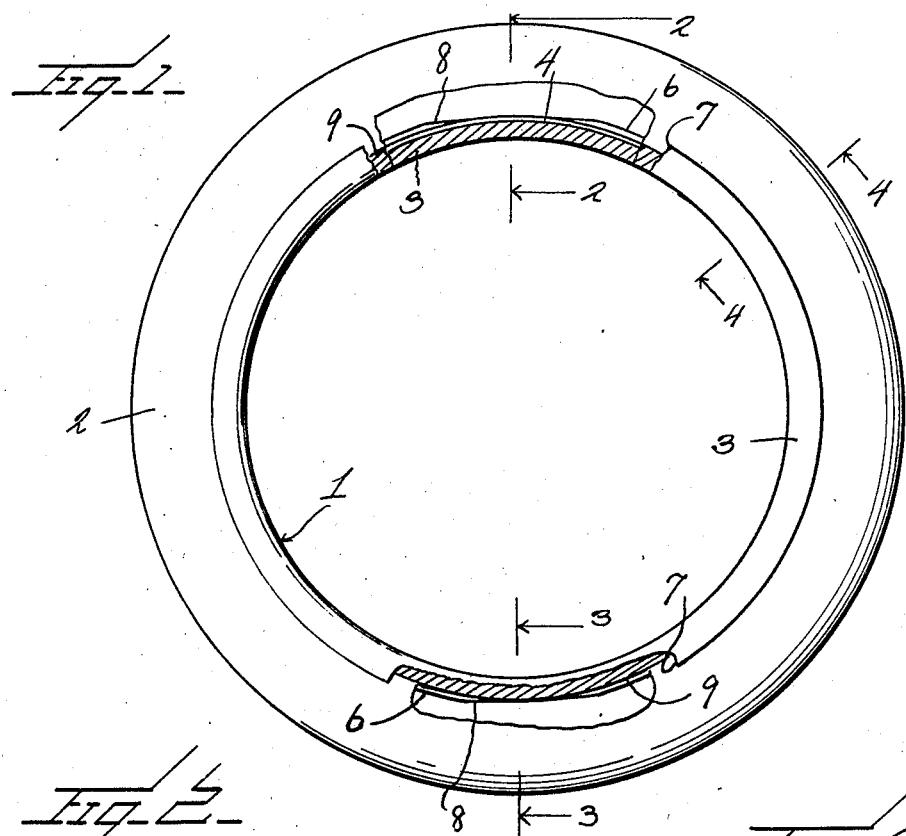
Fig. 1 is a view in side elevation of a rim and tire constructed in accordance with the present invention, parts of the same being broken away.
Figure 2:
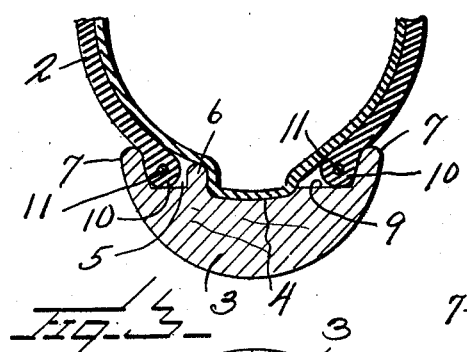
Fig. 2 is a section on line 2—2 of Fig. 1.

Referring now more particularly to the drawing, the numeral 1 generally designates a tire supporting wheel rim constructed in accordance with the present invention, while the numeral 2 generally designates a tire of the character to be used upon a rim of the construction herein shown.

At the present time certain bicycles, particularly racing bicycles, are equipped with light, fabric casings which, after the inner tube has been placed therein, are sewed up and are then secured by the use of glue onto the wheel rim. In the event of puncture, it is necessary to remove the casing and cut open the stitching for the repair or replacement of the tube. These tires usually carry from 100 to 140 lbs. of air pressure per square inch.

The present wheel rim is so constructed that when used to carry a casing having the edges reinforced by a suitable flexible but inextensible wire, it is possible to apply the casing in such a way that the wired edges of the casing will closely encircle and hold the rim and will be prevented from shifting from position when pressure is put therein, and the casing will not blow off of the rim.

The rim as illustrated in Figure 1 comprises the body portion 3 having the encircling central relatively deep channel 4. At each side of this channel there is formed a tire bead or edge receiving groove 5 which is separated from the central channel 4 throughout the major portion of the circumference of the rim by the inner bordering flange 6. As will be readily seen upon reference to Figure 4 the central channel 4 is cut deeper than the groove 5 and consequently the circumference of the central channel will be slightly less than the circumference of the grooves.

At the outer side of each groove there is formed the outer bordering flange 7 which is of greater height than the adjacent flange 6 and consequently is of greater circumference.

Figure 4:
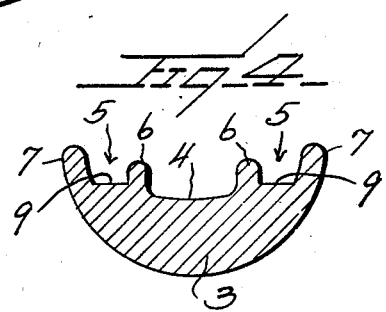
Fig. 4 is a section on line 4—4 of Fig. 1.
Figure 3:
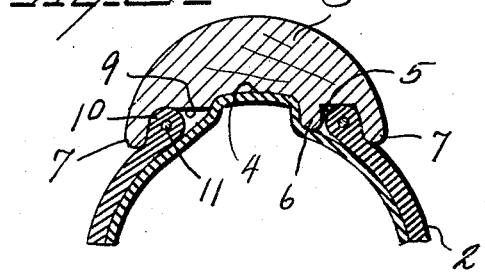
Fig. 3 is a section on line 3—3 of Fig. 1.

Each of the inner flanges 6 is cut down through a short portion of its length as shown in Figs. 3 and 4 and indicated by the reference character 8. These flanges are cut down in the short circumferential area illustrated, to the level of the bottom 9 of the adjacent groove, and this bottom 9 forms a supporting shoulder for an edge of the tire casing as hereinafter described. The cut down or cut out portion of one flange 6 is diametrically opposite that of the other flange so that wheel balance is maintained. In the construction of casings no success has been had prior to the present invention in the use of cable reinforcements for the edges of the tire due to the fact that it has not been possible to get away from the use of a very heavy and stiff cable or wire to maintain the tire in position upon the type of rim available. Even then the blowing off of the tire has occurred on account of the high pressure used. With the present invention the rim maintains the cable or reinforcing wire in the edge of the tire casing in a fixed position and the tire inner tube may be inflated to a high degree of pressure without danger of the tire blowing off. This is possible by the employment of a rim of special novel construction in association with the use in the tire of a light and flexible cable and by making the diameter of the edges of the tire conform exactly to the diameter or circumference of the shoulder 9 of the groove in the rim on which the tire is mounted. The tire 2 has the spaced annular beaded edges 10, the circumference of each of which is the same as the circumference of the shoulder of each rim groove. These beaded edges have extending therethrough a small diameter flexible and inelastic or inextensible wire 11.

In applying the tire to the rim one annular edge 10 is first placed on the rim so as to lie in the central channel 4. A portion of this annular edge is then raised from the channel 4 and moved through the space 8 of one flange 6 into the adjacent groove 5 and the edge of the tire is then worked into the groove 5 throughout the circumference of such edge until the same is completely in the groove. The inner tube may then be placed in the tire after which the opposite edge of the tire is located in the channel 4. By then grasping the tire casing at the central part between the edges and drawing the same laterally toward the side of the rim where the one tire edge has already been fitted in its groove 5, the other edge of the tire can be worked into its groove, so that the two edges will finally lie in the grooves 5 as shown in Fig. 5, and due to the substantially complete relatively high inner flanges 6 cooperating with the outer bordering flanges 7 the tire may be inflated under high pressure without danger of it being blown off.

From the foregoing it will be readily apparent that the tire and rim construction herein disclosed is of novel design and is such that the tire when accurately made to fit the rim can be applied and removed easily and quickly, and at the same time, when applied, it will maintain its position without danger of being blown off from excessive internal pressure.

Figure 5:
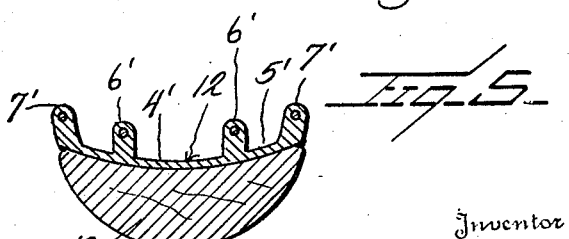
Fig. 5 is a transverse section thru a modified construction of the invention.

In Figure 5, there is shown a slight modification of the present invention wherein there is provided a metallic band 12 of arcuate cross-section designed to fit in the circumferentially channeled wooden rim body 13. This band 12 may be defined as a filler to fit to a wood rim shaped to provide the inner and outer flanges 6' and 7', respectively, which may be reinforced with wires, or in any other suitable manner, thus providing, as in the form shown in Figure 1, a central relatively deep channel 4' and the spaced side grooves 5' in which the reinforced annular edges of the tire casing may be fitted in the manner stated in connection with the form of the invention previously described.

I claim:

A single piece unsplit tire rim and a pneumatic tire having spaced annular edges, said edges each having a single small diameter wire extending throughout the length thereof, said rim having upon its perimeter an encircling central channel, and a groove upon each side of the channel and of greater circumferential extent, the circumference of the bottom of each groove being substantially equal to the inside circumference of the said edge of the tire which is located therein, and a substantially straight radially extending flange upon each side of each groove, the inner flange being of less height than the outer flange, each of said inner flanges having its height reduced to the level of the bottom of the adjacent groove through a relatively short extent of the circumference thereof, the reduced portion of one inner flange being directly opposite diametrically of the rim from the other.

ALFRED C. WESTON.